(12) United States Patent
Kuwahara (10) Patent No.: US 11,279,362 B2
(45) Date of Patent: Mar. 22, 2022

(54) AUTOMATIC DRIVING ASSIST APPARATUS

(71) Applicant: SUBARU CORPORATION, Tokyo (JP)

(72) Inventor: Keisuke Kuwahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 105 days.

(21) Appl. No.: 16/840,019

(22) Filed: Apr. 3, 2020

(65) Prior Publication Data

US 2020/0377102 A1 Dec. 3, 2020

(30) Foreign Application Priority Data

May 31, 2019 (JP) ............................. JP2019-102185

(51) Int. Cl.
*B60W 30/18* (2012.01)
*B60W 40/04* (2006.01)
*B60W 60/00* (2020.01)

(52) U.S. Cl.
CPC ...... *B60W 30/18163* (2013.01); *B60W 40/04* (2013.01); *B60W 60/0011* (2020.02)

(58) Field of Classification Search
CPC .. B60W 30/14; B60W 30/143; B60W 30/146; B60W 30/16; B60W 30/162; B60W 30/165; B60W 30/18163; B60W 40/04; B60W 50/0097; B60W 60/011; B60W 60/0017; B60W 60/0027; B60W 60/00272; B60W 60/00274; B60W 60/00276; G05D 1/0088; G05D 1/0212; G08G 1/22

See application file for complete search history.

(56) References Cited

U.S. PATENT DOCUMENTS

| 6,269,308 B1 * | 7/2001 | Kodaka ................. G01S 13/931 701/301 |
| 7,826,970 B2 * | 11/2010 | Kobayashi ............ B60W 40/09 701/300 |
| 8,666,599 B2 * | 3/2014 | Otuka .................... G08G 1/167 701/41 |

(Continued)

FOREIGN PATENT DOCUMENTS

| JP | 2003-063273 A | 3/2003 |
| JP | 2008242843 A * | 10/2008 |
| WO | WO-2019142284 A1 * | 7/2019 ........ B60W 60/0055 |

*Primary Examiner* — Angelina Shudy
(74) *Attorney, Agent, or Firm* — McDermott Will & Emery LLP (57) ABSTRACT

An automatic driving assist apparatus includes a map information acquirer; an own vehicle position estimator; a route information input unit; a traveling environment information acquirer, a traveling route setting unit, an other-vehicle traveling route acquirer, and an automatic driving controller. The automatic driving controller further includes a target travel path generator, an other-vehicle detection determiner, and a relative vehicle speed determiner, an other-vehicle traveling route determiner, and an automatic traveling controller. The automatic traveling controller causes the own vehicle to travel following another vehicle along a target travel path generated by the target travel path generator in a case where the other-vehicle traveling route determiner determines that a traveling route of the other vehicle is set in a direction of a branch path.

11 Claims, 6 Drawing Sheets

(56) References Cited

U.S. PATENT DOCUMENTS

| | | | | |
|---|---|---|---|---|
| 8,818,680 | B2* | 8/2014 | Isaji | B60W 30/18145 |
| | | | | 701/96 |
| 9,090,260 | B2* | 7/2015 | Clarke | H04N 5/247 |
| 9,528,838 | B2* | 12/2016 | Okumura | B60W 30/18154 |
| 9,809,164 | B2* | 11/2017 | Matsuno | B60W 30/18163 |
| 9,889,884 | B2* | 2/2018 | Matsuno | B62D 15/0255 |
| 9,963,149 | B2* | 5/2018 | Aoki | B60W 40/04 |
| 10,293,819 | B1* | 5/2019 | El-Khatib | B60W 50/14 |
| 10,457,278 | B2* | 10/2019 | Miyata | B60W 40/04 |
| 10,730,516 | B2* | 8/2020 | Ohashi | F02D 29/02 |
| 10,739,782 | B2* | 8/2020 | Eagelberg | G06K 9/00798 |
| 10,759,427 | B2* | 9/2020 | Ide | B60W 30/165 |
| 10,814,876 | B2* | 10/2020 | Liu | G05D 1/0088 |
| 10,875,528 | B2* | 12/2020 | Shalev-Shwartz | |
| | | | | B60W 50/0097 |
| 10,943,133 | B2* | 3/2021 | Oniwa | B60W 30/182 |
| 11,021,155 | B2* | 6/2021 | Tokimasa | B60W 40/02 |
| 11,027,736 | B2* | 6/2021 | Rajab | B60W 30/18163 |
| 11,052,914 | B2* | 7/2021 | Mehdi | B60W 40/06 |
| 11,077,862 | B2* | 8/2021 | Mimura | B60W 50/12 |
| 11,084,489 | B2* | 8/2021 | Ogino | B60W 30/143 |
| 11,091,161 | B2* | 8/2021 | Oh | B60W 30/18163 |
| 11,091,172 | B2* | 8/2021 | Mori | B60W 50/085 |
| 11,130,492 | B2* | 9/2021 | Toda | B60W 30/18163 |
| 2004/0140143 | A1* | 7/2004 | Saeki | B60K 31/0008 |
| | | | | 180/271 |
| 2007/0093951 | A1* | 4/2007 | Schroeder | B60Q 5/006 |
| | | | | 701/96 |
| 2013/0080019 | A1* | 3/2013 | Isaji | B60W 30/18145 |
| | | | | 701/96 |
| 2015/0153735 | A1* | 6/2015 | Clarke | G06T 7/285 |
| | | | | 701/301 |
| 2015/0360684 | A1* | 12/2015 | Matsuno | B60Q 9/00 |
| 2015/0360721 | A1* | 12/2015 | Matsuno | B60W 30/18163 |
| | | | | 701/41 |
| 2016/0054735 | A1* | 2/2016 | Switkes | H04W 4/44 |
| | | | | 701/23 |
| 2016/0161271 | A1* | 6/2016 | Okumura | G01C 21/34 |
| | | | | 701/25 |
| 2017/0066445 | A1* | 3/2017 | Habu | B62D 15/026 |
| 2017/0097642 | A1* | 4/2017 | Okuya | G05D 1/0278 |
| 2017/0122754 | A1* | 5/2017 | Konishi | B60W 30/18154 |
| 2017/0240176 | A1* | 8/2017 | Aoki | G08G 1/167 |
| 2017/0248959 | A1* | 8/2017 | Matsubara | B60W 10/20 |
| 2018/0257648 | A1* | 9/2018 | Katoh | G05D 1/0251 |
| 2018/0354510 | A1* | 12/2018 | Miyata | B60W 50/14 |
| 2019/0291728 | A1* | 9/2019 | Shalev-Shwartz | |
| | | | | B60W 30/165 |
| 2019/0333381 | A1* | 10/2019 | Shalev-Shwartz | |
| | | | | B60W 50/0097 |
| 2020/0339125 | A1* | 10/2020 | Reckziegel | B60W 60/0016 |
| 2020/0377117 | A1* | 12/2020 | Nojiri | B60W 30/12 |
| 2020/0398849 | A1* | 12/2020 | Kanoh | B60W 30/18163 |

* cited by examiner

AUTOMATIC DRIVING ASSIST APPARATUS

CROSS-REFERENCE TO RELATED APPLICATIONS

The present application claims priority from Japanese Patent Application No. 2019-102185 filed on May 31, 2019, the entire contents of which are hereby incorporated by reference.

BACKGROUND

The technology relates to an automatic driving assist apparatus configured to cause an own vehicle to follow another vehicle traveling ahead without passing, when a traveling route of the other vehicle traveling ahead is set in a direction of a branch path even if a vehicle speed of the other vehicle is slower than a set vehicle speed of the own vehicle.

An automatic driving assist apparatus mounted on a vehicle map-matches an own vehicle position on a high-precision road map (dynamic map) based on position information received from a positioning satellite such as Global Navigation Satellite System (GNSS) represented by a GPS satellite. Then, when an occupant (mainly a driver) sets a destination on the high-precision road map, a driving assist unit constructs a traveling route connecting an own vehicle position and the destination.

After that, the driving assist unit sets a target travel path for causing an own vehicle to travel automatically along the traveling route, for several kilometers ahead of the own vehicle. In the high-precision road map, road information necessary for automatic driving is stored. The road information includes lane number information (two lanes, three lanes, etc.), road width information, curve curvature information, and the like. The driving assist unit sets a target travel path for causing the own vehicle to travel in the center of a selected traveling lane, based on the road information in the high-precision road map. When the target travel path is set in a direction of a branch path such as a junction connecting a main lane and another main lane and an exit of an interchange connected to the main lane, Auto Lane Changing (ALC) control is executed for causing the own vehicle to change lane automatically in the direction of the branch path at a predetermined timing.

When a preceding vehicle whose speed is slower than a set vehicle speed of the own vehicle is traveling ahead of the own vehicle, the own vehicle follows the preceding vehicle, with a predetermined inter-vehicle distance maintained between the own vehicle and the preceding vehicle by the well-known Adaptive Cruise Control (ACC). However, if the speed difference between the set vehicle speed of the own vehicle and the vehicle speed of the preceding vehicle is large, the own vehicle is likely to be controlled to travel following the preceding vehicle against the driver's intention.

Japanese Unexamined Patent Application Publication (JP-A) No. 2003-63273 discloses the technology in which lane change to an adjacent lane is performed by automatic steering to cause the own vehicle to pass the preceding vehicle when the vehicle speed of the preceding vehicle relative to a set vehicle speed of the own vehicle is equal to or lower than a set vehicle speed. The technology disclosed in the publication causes the own vehicle to pass the preceding vehicle by the automatic steering, which enables a burden of the driver to be reduced.

SUMMARY

An aspect of the technology provides an automatic driving assist apparatus. The apparatus includes a map information acquirer, an own vehicle position estimator, a route information input unit, a traveling environment information acquirer, a traveling route setting unit, an other-vehicle traveling route acquirer, and an automatic driving controller. The map information acquirer is configured to acquire road map information. The own vehicle position estimator is configured to estimate an own vehicle position that is a current position of an own vehicle. The route information input unit is configured to receive an input of information of a destination by an operation from outside. The traveling environment information acquirer is configured to acquire traveling environment information around the own vehicle. The traveling route setting unit is configured to set a traveling route connecting the own vehicle position estimated by the own vehicle position estimator and the destination input through the route information input unit, based on the road map information acquired by the map information acquirer. The other-vehicle traveling route acquirer is configured to acquire a traveling route of another vehicle through a communication from outside. The automatic driving controller includes a target travel path generator, an other-vehicle detection determiner, a relative vehicle speed determiner, an other-vehicle traveling route determiner, and an automatic traveling controller. The target travel path generator is configured to generate, on the traveling route set by the traveling route setting unit, a target travel path along which the own vehicle is caused to travel by automatic driving. The other-vehicle detection determiner is configured to determine whether the other vehicle is detected on a traveling lane on which the own vehicle is traveling, based on the traveling environment information acquired by the traveling environment information acquirer. The relative vehicle speed determiner is configured to determine whether a relative vehicle speed between a set vehicle speed of the own vehicle and a vehicle speed of the other vehicle exceeds a predetermined threshold speed, in a case where the other-vehicle detection determiner detects the other vehicle traveling ahead of the own vehicle. The other-vehicle traveling route determiner is configured to determine whether the traveling route of the other vehicle is set in a direction of a branch path, based on the traveling route of the other vehicle acquired by the other-vehicle traveling route acquirer in a case where the relative vehicle speed determiner determines that the relative vehicle speed exceeds the predetermined threshold speed. The automatic traveling controller is configured to cause the own vehicle to travel following the other vehicle along the target travel path generated by the target travel path generator without passing the other vehicle in a case where the other-vehicle traveling route determiner determines that the traveling route of the other vehicle is set in the direction of the branch path.

Another aspect of the technology provides an automatic driving assist apparatus including circuitry. The circuitry is configured to acquire road map information. The circuitry is configured to estimate an own vehicle position that is a current position of an own vehicle. The circuitry is configured to receive an input of information of a destination by an operation from outside. The circuitry is configured to acquire traveling environment information around the own vehicle. The circuitry is configured to set a traveling route connecting the estimated own vehicle position and the input destination, based on the road map information. The circuitry is configured to acquire a traveling route of another vehicle through a communication from outside. The circuitry is configured to generate, on the set traveling route, a target travel path along which the own vehicle is caused to travel by automatic driving. The circuitry is configured to determine whether the other vehicle is detected on a traveling lane on which the own vehicle is traveling, based on the acquired traveling environment information. The circuitry is configured to determine whether a relative vehicle speed between a set vehicle speed of the own vehicle and a vehicle speed of the other vehicle exceeds a predetermined threshold speed, in a case where the other vehicle traveling ahead of the own vehicle is detected. The circuitry is configured to determine whether the traveling route of the other vehicle is set in a direction of a branch path, based on the acquired traveling route of the other vehicle, in a case where a determination is made that the relative vehicle speed exceeds the predetermined threshold speed. The circuitry is configured to cause the own vehicle to travel following the other vehicle along the generated target travel path without passing the other vehicle in a case where a determination is made that the traveling route of the other vehicle is set in the direction of the branch path.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

A description is given below of some embodiments of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiments which are not recited in a most-generic independent claim of the disclosure are optional and may be provided on an as-needed basis. The drawings are schematic and are not intended to be drawn to scale.

In the technology disclosed in the above-described JP-A No. 2003-63273, when the own vehicle passes the preceding vehicle, whether a following vehicle is present on an adjacent lane is confirmed, and if a following vehicle is detected, following traveling is continued without causing the own vehicle to pass the preceding vehicle.

In this case, if the preceding vehicle attempts to change lane in the direction of the branch path ahead, for example, the preceding vehicle is gradually apart from the traveling lane ahead of the own vehicle. Therefore, even if the own vehicle performs lane change by automatic steering in order to pass the preceding vehicle, steering control is performed immediately after the lane change to bring the traveling direction of the own vehicle back to the original traveling lane, which may result in impairment of traveling stability of the own vehicle.

Even in the state where the preceding vehicle travels in the direction of the branch path, if the travel path of the own vehicle is not brought back to the original traveling lane and passing traveling on the adjacent lane is continued, the driver would have a feeling of incompatibility.

However, confirmation on whether the preceding vehicle attempts to change the travel path in the direction of the branch path cannot be made until the preceding vehicle flashes the blinker. The blinker is often flashed immediately before the branch path. Therefore, in many cases, the own vehicle has already started lane change when the blinker of the preceding vehicle is flashed, which results in a difficulty in solving the above-described problem.

It is desirable to provide an automatic driving assist apparatus capable of ensuring traveling stability of an own vehicle and reducing a feeling of incompatibility to be given to a driver during a traveling by automatic driving, by continuing following traveling in accordance with a traveling state of a vehicle traveling ahead of the own vehicle, even in a case where the own vehicle attempts to pass the vehicle traveling ahead when a vehicle speed of the vehicle traveling ahead is slower than a set vehicle speed of the own vehicle.

Figure 1:
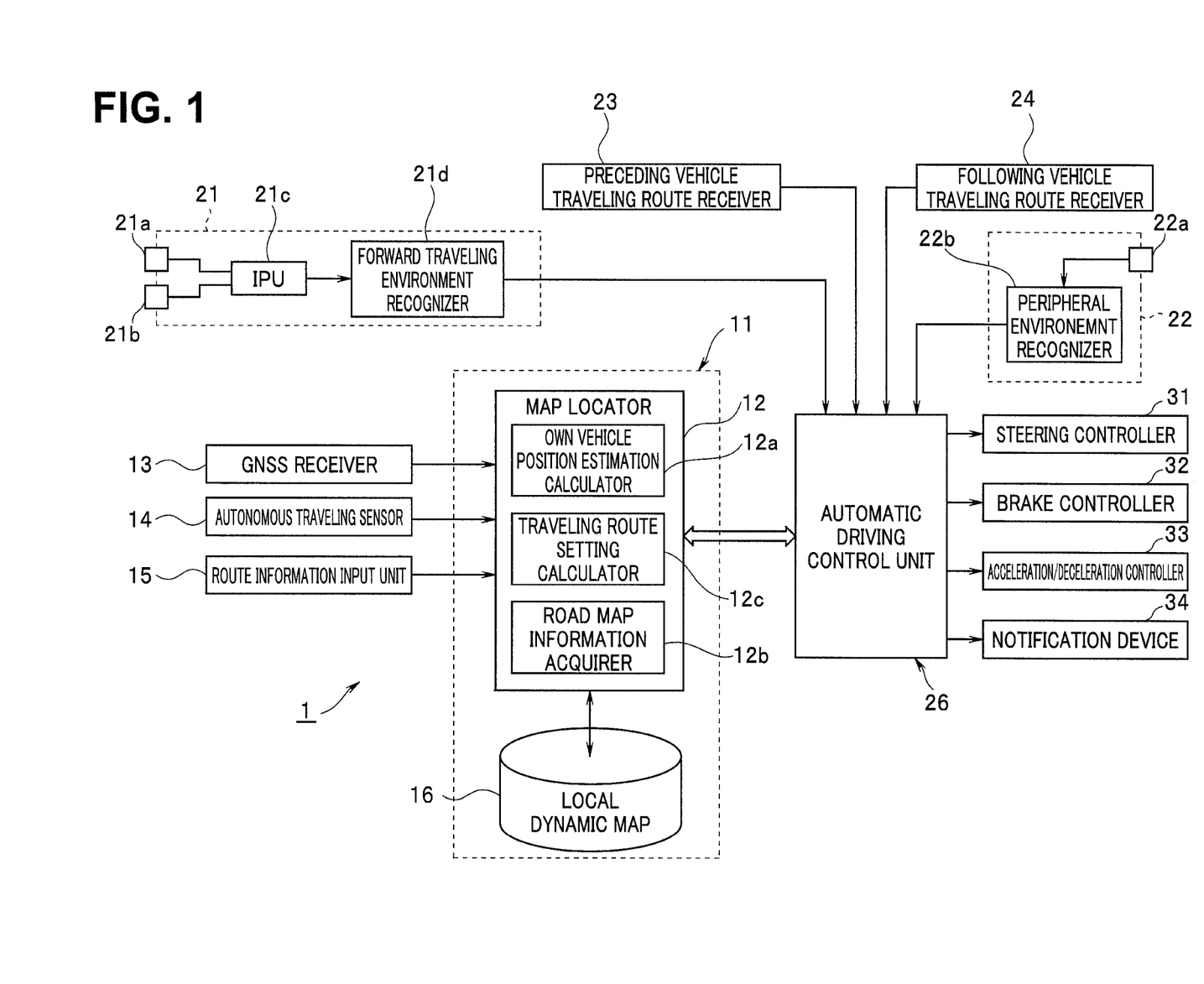
FIG. 1 is a function block diagram of an automatic driving assist system.

An embodiment of the technology will be described below based on the drawings. An automatic driving assist system illustrated in FIG. 1 is mounted on an own vehicle M (see FIGS. 5 and 6). The automatic driving assist system 1 includes a locator unit 11 configured to detect a current position (own vehicle position) of the own vehicle M, a camera unit 21 configured to recognize a traveling environment ahead of the own vehicle M, and a peripheral monitoring unit 22 configured to monitor a traveling environment around the own vehicle M. Both of the units 21 and 22 have a function as a traveling environment information acquirer of the technology. The automatic driving assist system includes a redundant system, and if a malfunction occurs in either one of the locator unit 11 and the camera unit 21, the redundant system allows the automatic driving assist to be temporarily continued with the other unit in which no malfunction occurs.

Furthermore, the automatic driving assist system 1 includes: a preceding vehicle traveling route receiver 23 configured to receive a traveling route of a preceding vehicle P (see FIG. 5, corresponding to P1 and P2 in FIG. 6) as another vehicle through a vehicle-to-vehicle communication; a following vehicle traveling route receiver 24 configured to receive a traveling route of a following vehicle F (see FIG. 6) as another vehicle through a vehicle-to-vehicle communication; and an automatic driving control unit 26 as an automatic driving controller. Both of the traveling route receivers 23, 24 correspond to an other-vehicle traveling route acquirer of the technology.

The automatic driving control unit 26 compares the information acquired from the locator unit 11 with the information acquired from the camera unit 21 during the traveling in an automatic driving section where automatic driving is possible, to constantly monitor, regarding the road shape of the road on which the own vehicle is currently traveling, whether the information on the road shape acquired from the camera unit 21 and the information on the road shape acquired from the locator unit 11 match with each other, and if the both pieces of information match with each other, the automatic driving control unit 26 continues the automatic driving.

The locator unit 11 estimates the own vehicle position on the road map, and acquires road map data around and ahead of the own vehicle position. On the other hand, the camera unit 21 calculates a road curvature at the center of lane markers marking the left and right of the lane on which the own vehicle M is traveling (own vehicle traveling lane), and detects a lateral position deviation in the vehicle width direction of the own vehicle M, with the center of the left and right lane markers as a reference. Furthermore, the camera unit 21 recognizes a moving body represented by the preceding vehicle traveling ahead of the own vehicle and a three-dimensional object such as a fixed object, and identifies such a moving body and object.

The locator unit 11 includes a map locator calculator 12, and a high-precision road map database 16 as a storage unit. The map locator calculator 12, a forward traveling environment recognizer 21d, a peripheral environment recognizer 22b, and the automatic driving control unit 26, which will be described later, are configured by a well-known microcomputer including a CPU, RAM, ROM, a non-volatile storage unit and the like and peripheral equipment thereof, and fixed data such as a program executed by the CPU, a data table and the like are stored in the ROM in advance.

A Global Navigation Satellite System (GNSS) receiver 13, an autonomous traveling sensor 14, and a route information input unit 15 are coupled with an input side of the map locator calculator 12. The GNSS receiver 13 receives positioning signals transmitted from a plurality of positioning satellites. The autonomous traveling sensor 14 enables autonomous traveling in an environment such as traveling in a tunnel in which a reception sensitivity from the GNSS satellite is low, and the positioning signals cannot be effectively received. The autonomous traveling sensor 14 includes a vehicle speed sensor, a yaw rate sensor, a longitudinal acceleration sensor, and the like. That is, the map locator calculator 12 performs localization from a moving distance and an azimuth based on a vehicle speed detected by the vehicle speed sensor, a yaw rate (yaw angular velocity) detected by the yaw rate sensor, the longitudinal acceleration detected by the longitudinal acceleration sensor, and the like.

The route information input unit 15 is a terminal device operated from outside by an occupant (mainly, a driver). That is, the route information input unit 15 can receive an intensive input of a series of information, such as a destination and a transit point, required in setting of a traveling route by the map locator calculator 12. Furthermore, the route information input unit 15 can turn on/off the automatic driving.

The route information input unit 15 is an input unit (a touch panel on a monitor, for example) of a car navigation system, a mobile terminal such as a smart phone, a personal computer, or the like, and is coupled to the map locator calculator 12 by wired or wireless connection. When the occupant operates the route information input unit 15 and inputs information of the destination and the transit point (a facility name, an address, a telephone number, or the like), the input information is read by the map locator calculator 12.

When the destination and the transit point are input, the map locator calculator 12 sets the position coordinates (latitude, longitude) of the destination and the transit point. The map locator calculator 12 includes: an own vehicle position estimation calculator 12a, as an own vehicle position estimator, configured to estimate an own vehicle position; a map information acquirer 12b configured to specify the current position of the own vehicle M by map-matching the own vehicle position estimated by the own vehicle position estimation calculator 12a on the road map, to acquire the road map information including peripheral environment information around the current position; and a traveling route setting calculator 12c, as a traveling route setting unit, configured to set a traveling route from the own vehicle position to the destination (and the transit point).

In addition, the high-precision road map database 16 is a large-capacity storage medium such as an HDD in which the well-known high-precision road map information (local dynamic map) is stored. The high-precision road map information has a hierarchical structure in which additional map information required for supporting automatic traveling is superposed on the lowermost static information layer which is the base. The static information layer includes high-precision three-dimensional map information, in which static information with the smallest change is stored. The static information includes road information (ordinary road, expressway, etc.), lane information (one lane, two lanes, three lanes, non-passing zone, etc.), intersection information, three-dimensional structures, permanent restriction information (regulation speed), and the like.

On the other hand, the additional map information is classified into three layers, that is, a quasi-static information layer, a quasi-dynamic information layer, and a dynamic information layer in this order from the lower layer. The respective layers are classified according to the degree of change (variation) along a time axis, and information with the largest change, like rainfall information, which is required to be updated in real time is stored in the dynamic information layer. Furthermore, pieces of information, such as traffic jam information and traffic regulation due to accident or construction, which do not change as much as the dynamic information are stored in the quasi-static information layer or in the quasi-dynamic information layer. The additional map information is referred to, when the automatic driving control unit 26 generates a target travel path.

The above-described map information acquirer 12b acquires the road map information of the current position and ahead of the own vehicle from the road map information stored in the high-precision road map database 16.

The own vehicle position estimation calculator 12a acquires current position coordinates (latitude, longitude) of the own vehicle M, based on the positioning signal received by the GNSS receiver 13, map-matches the position coordinates on the map information, and estimates the own vehicle position (current position) on the road map. The own vehicle position estimation calculator 12a identifies the own vehicle traveling lane, acquires the road shape of the traveling lane stored in the map information, and successively stores the acquired road shape.

Furthermore, in an environment where the effective positioning signal from the positioning satellite cannot be received due to a lowered sensitivity of the GNSS receiver 13 as in traveling in a tunnel, the own vehicle position estimation calculator 12a switches to an autonomous navigation and executes localization with the autonomous traveling sensor 14.

The traveling route setting calculator 12c refers to the local dynamic map stored in the high-precision road map database 16, based on the position information (latitude, longitude) of the own vehicle position estimated by the own vehicle position estimation calculator 12a and the position information (latitude, longitude) of the input destination (and the transit point). Then, the traveling route setting calculator 12c constructs, on the local dynamic map, a traveling route connecting the own vehicle position and the destination (when the transit point is set, the destination via the transit point) in accordance with the route conditions (recommended route, fastest route, and the like) set in advance.

On the other hand, the camera unit 21 is fixed to a center of an upper part of a front part in a cabin of the own vehicle M, and includes an in-vehicle camera (stereo camera) having a main camera 21a and a sub camera 21b disposed at symmetric positions across the center in the vehicle width direction, an image processing unit (IPU) 21c, and a forward traveling environment recognizer 21d. The camera unit 21 acquires reference image data with the main camera 21a and acquires comparison image data with the sub camera 21b.

Then, the both image data are processed into predetermined data in the IPU 21c. The forward traveling environment recognizer 21d reads the reference image data and the comparison image data that are subjected to the image processing in the IPU 21c, recognizes the same one object in both of the images based on the parallax between the images, calculates distance data (distance from the own vehicle M to the object) by using the principle of triangulation, and recognizes the forward traveling environment information.

The forward traveling environment information includes various kinds of information required for performing driving assist such as the well-known Adaptive Cruise Control (ACC) and Active Lane Keep control (ALK). The various kinds of information includes, for example, the road shape (the lane markers marking the left and right of the lane, the road curvature 1/m at the center of the lane markers, and the width between the left and right lane markers (lane width)) of the lane on which the own vehicle M travels (traveling lane), information on the preceding vehicle P traveling immediately ahead of the own vehicle M (inter-vehicle distance and relative vehicle speed between the own vehicle M and the preceding vehicle P), and the like.

On the other hand, the peripheral monitoring unit 22 includes a peripheral environment recognition sensor 22a configured by an ultrasonic sensor, a millimeter wave radar, Light Detection and Ranging (LIDAR), etc., and a peripheral environment recognizer 22b configured to recognize moving body information around the own vehicle M based on the signal from the peripheral environment recognition sensor 22a. The peripheral environment recognition sensor 22a detects a moving body (parallel traveling vehicle, following vehicle, etc.) around the own vehicle M. If the moving body is a following vehicle, the peripheral environment recognition sensor 22a detects the inter-vehicle distance and the relative vehicle speed between the own vehicle M and the following vehicle.

In addition, the forward traveling environment recognizer 21d of the above-described camera unit 21, the peripheral environment recognizer 22b of the peripheral monitoring unit 22, the preceding vehicle traveling route receiver 23, and the following vehicle traveling route receiver 24 are coupled to the input side of the automatic driving control unit 26. Moreover, the automatic driving control unit 26 is coupled to the map locator calculator 12 in a bidirectional communication available state, through an in-vehicle communication line (Controller Area Network: CAN, for example).

Furthermore, a steering controller 31 which causes the own vehicle M to travel along the traveling route, a brake controller 32 which decelerates the own vehicle M by forced brake, an acceleration/deceleration controller 33 which controls a vehicle speed of the own vehicle M, and a notification device 34 such as a monitor, a speaker and the like, are coupled to the output side of the automatic driving control unit 26.

The automatic driving control unit 26 controls, in the automatic driving section, the steering controller 31, the brake controller 32, and the acceleration/deceleration controller 33 in a predetermined manner, to cause the own vehicle M to travel automatically along the target travel path for automatic driving set on the traveling route constructed by the traveling route setting calculator 12c, based on the positioning signal indicating the own vehicle position, which has been received by the GNSS receiver 13. At that time, the automatic driving control unit 26 causes the own vehicle M to travel at a set vehicle speed (vehicle speed set by the driver) within the speed limit by the well-known ACC control and the ALK control based on the forward traveling environment recognized by the forward traveling environment recognizer 21d. When the preceding vehicle P is detected, the automatic driving control unit 26 cause the own vehicle M to travel following the preceding vehicle P, with the predetermined inter-vehicle distance maintained.

In the ACC control during the automatic driving, even if the preceding vehicle P is detected on the target travel path ahead of the own vehicle M, when the vehicle speed of the preceding vehicle P (preceding vehicle speed) exceeds the set vehicle speed of the own vehicle M, the own vehicle M is caused to travel at the set vehicle speed without following the preceding vehicle P. On the other hand, when the preceding vehicle speed is lower than the set vehicle speed of the own vehicle M, as described above, after the predetermined inter-vehicle distance is reached, the own vehicle M is caused to travel following the preceding vehicle. At that time, if the relative vehicle speed (obtained by subtracting the preceding vehicle speed from the set vehicle speed) is equal to or higher than the predetermined vehicle speed, the automatic driving control unit 26 performs passing control to cause the own vehicle M to pass the preceding vehicle, since the speed difference is large.

However, even in the case where the target travel path of the own vehicle M is set in the straight forward direction, when it is expected that the preceding vehicle P decelerates to change the travel path in the direction of the branch path, even if having once executed the passing control, the automatic driving control unit 26 has to immediately perform control to bring the travel path of the own vehicle M back to the original lane. Therefore, continuing the following traveling enables the traveling stability to be more surely ensured. Similarly, in the case where the target travel path of the own vehicle M is set in the direction of the branch path, it is necessary to control the own vehicle to change the travel path immediately after the own vehicle has passed the preceding vehicle. Therefore, also in this case, continuing the following traveling enables the traveling stability to be more surely ensured.

The automatic driving control unit 26 according to the present embodiment checks whether the preceding vehicle traveling route is set in the direction of the branch path or the straight forward direction, based on the traveling route of the preceding vehicle P (preceding vehicle traveling route) acquired by the preceding vehicle traveling route receiver 23 through the vehicle-to-vehicle communication, and when the preceding vehicle traveling route is set in the direction of the branch path, the automatic driving control unit 26 causes the own vehicle to travel following the preceding vehicle without executing the passing control.

Figure 2:
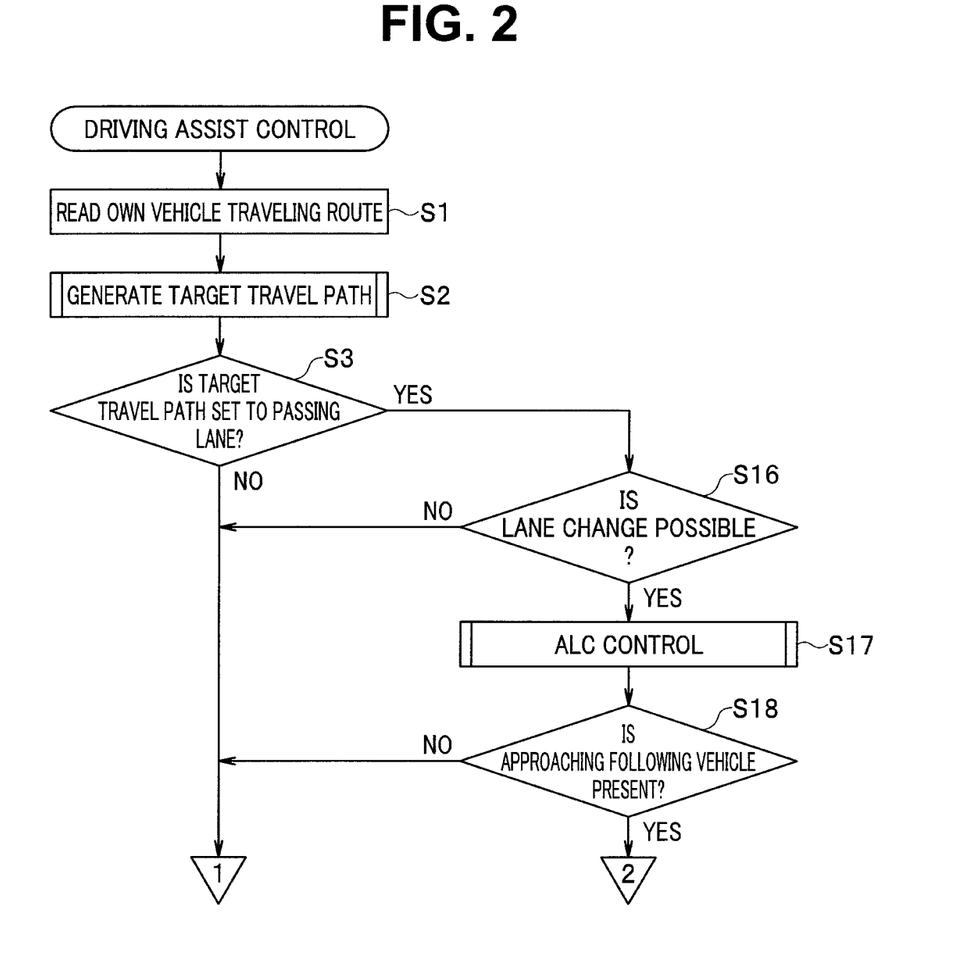
FIG. 2 is a flowchart (No. 1) illustrating a driving assist control routine.
Figure 3:
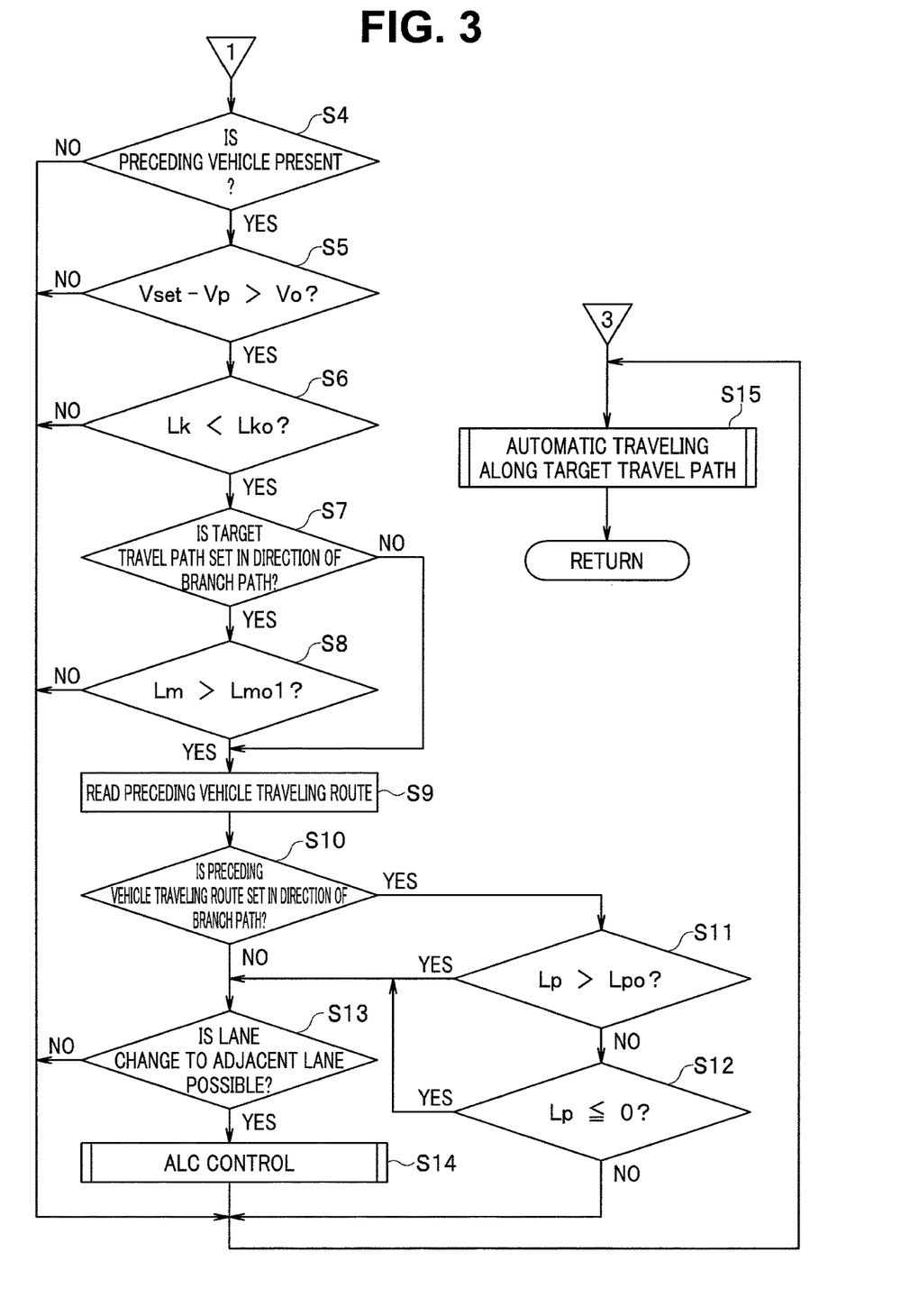
FIG. 3 is a flowchart (No. 2) illustrating the driving assist control routine.
Figure 4:
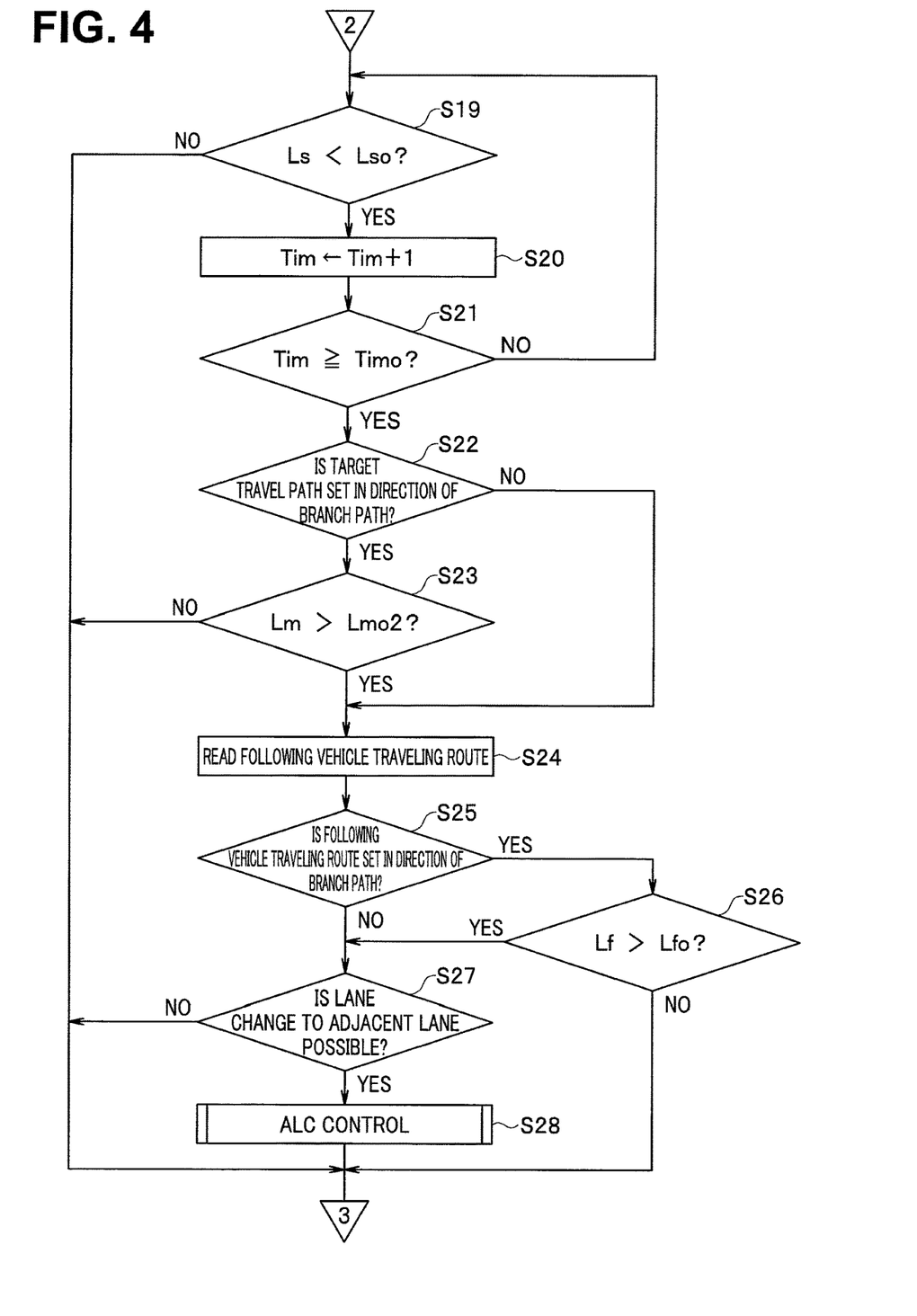
FIG. 4 is a flowchart (No. 3) illustrating the driving assist control routine.

The passing control executed by the automatic driving control unit 26 is executed in the driving assist control routine illustrated in FIGS. 2 to 4.

The routine is activated in the case where the automatic driving is ON, the own vehicle M is traveling in the automatic driving section, and a determination is made that the information on the road shape of the road on which the own vehicle is traveling acquired from the locator unit 11 and the information on the road shape acquired from the camera unit 21 match with each other.

First, in step S1, the traveling route (own vehicle traveling route) constructed by the traveling route setting calculator 12c of the map locator calculator 12 is read. In step S2, the target travel path for causing the own vehicle M to travel along the own vehicle traveling route is generated for several kilometers ahead, based on the additional map information in the local dynamic map stored in the map database 16. The items set as the target travel path include a lane on which the own vehicle M is caused to travel (for example, if there are three lanes, on which of the lanes the own vehicle M is caused to travel), a timing of the lane change in the case where the target travel path is set in the direction of the branch path, and the like. Note that the processing in the step S2 corresponds to a target travel path generator of the technology.

Figure 5:
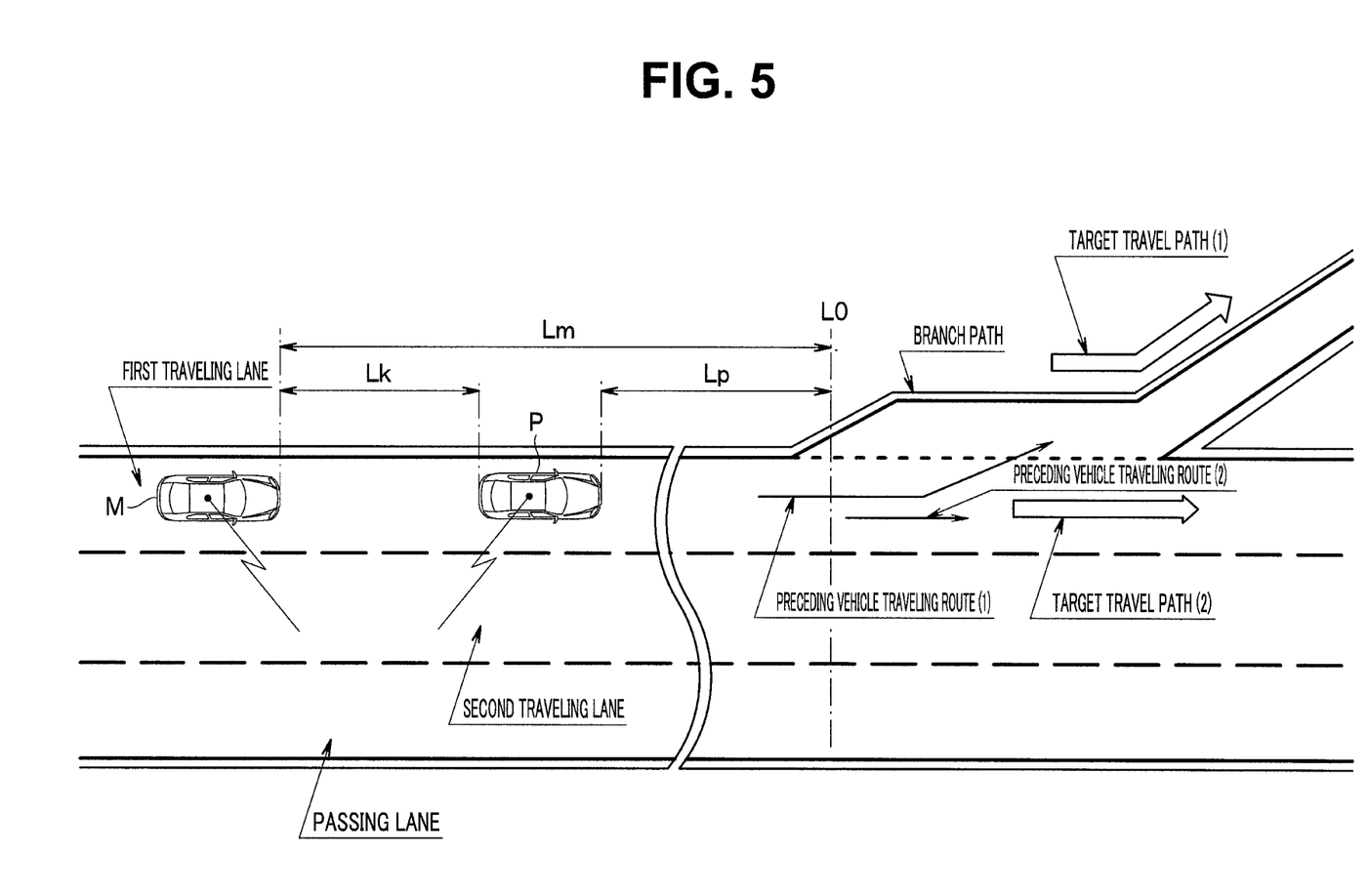
FIG. 5 is an explanatory view illustrating a state where passing against a preceding vehicle is determined based on a relation between a traveling route of the preceding vehicle and a target travel path of an own vehicle.

Next, the process proceeds to step S3 to check whether the target travel path ahead (within 1 to 2 kilometers, for example) of the own vehicle M is set to the passing lane (see FIG. 5). If the target travel path is set to the traveling lane (in the case of three lanes illustrated in FIG. 5, the first lane or the second lane), the process proceeds to step S4. If the target travel path is set to the passing lane, the process branches to step S16.

If a determination is made that the target travel path is not set in the direction of the passing lane, and the process proceeds to step S4, it is checked whether the preceding vehicle P is recognized in a predetermined distance (within several hundred meters) ahead of the own vehicle M, based on the forward traveling environment recognized by the forward traveling environment recognizer 21d of the camera unit 21. When the preceding vehicle P is not detected, the process exits from the routine, and the own vehicle M is caused to travel automatically along the target travel path set to the current traveling lane. The processing in the step S4 corresponds to an other-vehicle detection determiner of the technology.

On the other hand, when the preceding vehicle P is recognized within the several hundred meters ahead of the own vehicle M, the process proceeds to step S5, and in steps 5 to 13, a determination is made on whether to pass the preceding vehicle P. First, in the step S5, comparison is made between a determination threshold Vo and the relative vehicle speed (Vset−Vp) between the set vehicle speed Vset set for the own vehicle M within the speed limit and the vehicle speed Vp (value obtained by adding the relative vehicle speed calculated based on the change of the inter-vehicle distance Lk to the own vehicle speed Vm) of the preceding vehicle P, the vehicle speed Vp being calculated based on the forward traveling environment recognized by the forward traveling environment recognizer 21d of the camera unit 21. The determination threshold Vo is a speed at which the driver does not have a feeling of incompatibility even if the vehicle speed (own vehicle speed) of the own vehicle M is decelerated to cause the own vehicle to follow the preceding vehicle P. The determination threshold Vo may be a fixed value (approximately 5 to 10 km/h, for example) obtained in advance through an experiment or the like, or may be a variable value set by the driver.

In the case of Vset−Vp>Vo, it is determined that the relative vehicle speed is great and the process proceeds to step S6. In the case of Vset−Vp≤Vo, it is determined that the relative vehicle speed is small and the process jumps to step S15 for performing the following traveling. The processing in the step S5 corresponds to a relative vehicle speed determiner of the technology.

When the process proceeds to the step S6, it is checked whether the inter-vehicle distance Lk between the own vehicle M and the preceding vehicle P, which has been calculated based on the information on the preceding vehicle recognized by the camera unit 21, reaches a lane change start inter-vehicle distance Lko set in advance. The lane change start inter-vehicle distance Lko is the inter-vehicle distance at which the lane change is started. Based on the vehicle speed (own vehicle speed) Vm of the own vehicle M, the higher the own vehicle speed Vm, the longer the lane change start inter-vehicle distance is set.

Then, in the case of Lk≥Lko, it is determined that the lane change start timing has not been reached yet, and the process jumps to step S15. On the other hand, in the case of Lk<Lko, it is determined that the lane change start timing has been reached, and the process proceeds to step S7. In the step S7, it is checked whether the target travel path ahead of the own vehicle M is set in the direction of the branch path. If the target travel path is set in the direction of the branch path (the target travel path (1) in FIG. 5), the process proceeds to step S8. If the target travel path is set in the straight forward direction (the target travel path (2) in FIG. 5), the process jumps to step S9.

When the process proceeds to the step S8, the distance Lm (see FIG. 5) from the own vehicle M to the branch point L0 (branch point reaching distance) is confirmed based on the own vehicle position and the additional map information in the dynamic map, and comparison is made between the branch point reaching distance Lm and a branch point reaching determination threshold distance Lmo1. Note that the branch point L0 is set at the branch path entrance which is a connecting part of the main lane and the branch path.

The branch point reaching determination threshold distance Lmo1 is a distance at which the traveling stability is likely to be impaired, for example, when the own vehicle M passes the preceding vehicle P, change of the travel path in the direction of the branch path may have to be performed with sudden steering. The branch point reaching determination threshold distance Lmo1 is obtained in advance based on an experiment, or the like. In the case of Lm≤Lmo1, it is determined that the lane change is difficult, and the process jumps to step S15. In the case of Lm>Lmo1, it is determined that the lane change is possible, and the process proceeds to step S9.

When the process proceeds to the step S9 from the step S7 or the step S8, the traveling route (preceding vehicle traveling route) set in the navigation system of the preceding vehicle P is acquired through the vehicle-to-vehicle communication. Then, the process proceeds to step S10, and it is checked whether the preceding vehicle traveling route is set in the direction of the branch path. If the preceding vehicle traveling route is set in the direction of the branch path (the preceding vehicle traveling route (1) in FIG. 5), the process branches to step S11. If the preceding vehicle traveling route is set in the straight forward direction (preceding vehicle traveling route (2) in FIG. 5), the process proceeds to step S13.

When the process proceeds to the step S11, a distance (branch point reaching distance) Lp from the preceding vehicle P to the branch point L0 is calculated based on the preceding vehicle traveling route, and the branch point reaching distance Lp is compared with a branch point reaching determination threshold distance Lpo. The branch point reaching determination threshold distance Lpo is a distance (1000 to 500 meters, for example) in which it is determined that the traveling to follow the preceding vehicle P enables the traveling stability to be ensured more surely, since the preceding vehicle P will change the travel path in the direction of the branch path soon even if the own vehicle M passes the preceding vehicle P. In the case of Lp>Lpo, it is determined that the lane change is possible, and the process proceeds to the step S13. In the case of Lp≤Lpo, the process proceeds to step S12.

In the step S12, the timing at which the preceding vehicle P starts steering in the direction of the branch path is estimated. In the present embodiment, the time when the preceding vehicle P reaches the branch point L0 is estimated as the steering start timing.

In the case of Lp≤0, it is estimated that the steering start timing has been reached, and the process proceeds to the step S13. In the case of Lp>0, it is determined that lane change is not required, and the process jumps to step S15. Note that the processing in the above-described steps S5, S6, and S10 to S12 corresponds to an other-vehicle traveling route determiner of the technology.

When the process proceeds to the step S13 from any of the steps S10 to S12, in order to check whether lane change to the adjacent lane is possible, it is checked whether at least one of an immediately preceding vehicle or a parallel traveling vehicle is recognized on the adjacent lane to which lane change is to be performed and whether a following vehicle is recognized on the adjacent lane within a preset distance, based on the forward traveling environment of the adjacent lane, which is recognized by the forward traveling environment recognizer 21d of the camera unit 21, and the moving body information recognized by the peripheral environment recognizer 22b of the peripheral monitoring unit 22. The preset distance is a sufficient distance not to interfere with the traveling of the following vehicle when the own vehicle M performs lane change. The preset distance is set in advance based on an experiment or the like.

When at least one of an immediately preceding vehicle or a parallel traveling vehicle is recognized, or a following vehicle is recognized within the preset distance, a determination is made that lane change to the adjacent lane is difficult, and the process jumps to the step S15. When neither an immediately preceding vehicle nor a parallel traveling vehicle is recognized and no following vehicle is recognized within the preset distance, a determination is made that the lane change to the adjacent lane is possible, and the process proceeds to step S14. In the step S14, Auto Lane Changing (ALC) control is executed, and the process proceeds to the step S15. When the ALC control is executed, first, the blinker on the side to which the lane change is to be performed is flashed, and after the lapse of predetermined time period (3 seconds, for example), steering operation is automatically started and the lane change is executed within a predetermined time period. After the lane change to the adjacent lane is completed, the process proceeds to the step S15.

In the step S14, when a determination is made that the preceding vehicle P has passed the branch point L0 in the above-described step S12 (Lp≤0), it is estimated that the preceding vehicle P starts steering in the direction of the branch path, and the ALC control causes the blinker to flash for the predetermined time period, and then performs steering operation. At that time, under the ALC control, complete lane change to the adjacent lane is not performed, and traveling control is performed to cause the own vehicle to pass through the preceding vehicle with slight steering operation, without greatly changing the travel path. That is, since the preceding vehicle P steers in the direction of the branch path, passing of the preceding vehicle is possible with slight deviation from the current traveling lane, which enables the steering control suited for the driving sense of the driver. Note that the processing in the step S14, and step S28, which will be described later, corresponds to a lane change controller of the technology.

When the process proceeds to the step S15 from any of the steps S4 to S6, the step S8, the step S12, the step S13, or the step S14, the own vehicle M is caused to travel automatically along the target travel path, and the process exits from the routine. In the step S15, the respective controllers 31 to 33 are controlled and operated, to cause the own vehicle M to travel automatically along the target travel path. Note that the processing in the step S14 described above, step S28, and step S15 corresponds to an automatic traveling controller of the technology.

In the case where the lane change is performed in the step S14 by the ALC control, in the step S15, the target travel path is temporarily set on the adjacent lane to which the lane change has been performed and after the own vehicle M passes through the preceding vehicle P, the target travel path is reconstructed in the above-described step S2.

Thus, in the present embodiment, even in the case where a determination is made that the relative vehicle speed (Vset−Vp) between the set vehicle speed Vset of the own vehicle M and the vehicle speed Vp of the preceding vehicle P exceeds the determination threshold Vo, when it is determined that the preceding vehicle P or the own vehicle M will change the travel path in the direction of the branch path within a predetermined distance ahead, the ALC control is not executed, to cause the own vehicle M to follow the preceding vehicle P along the target travel path, which enables the traveling stability of the own vehicle M to be ensured. Furthermore, unnecessary ALC control is prevented, thereby be capable of reducing the feeling of incompatibility to be given to the driver.

On the other hand, if a determination has been made that the target travel path is set in the direction of the passing lane in the above-described step S3, and the process branches to the step S16, it is checked whether lane change to the passing lane is possible. Whether the lane change is possible is determined depending, for example, on whether the own vehicle M has reached the lane change timing and whether a following vehicle traveling on the passing lane is recognized within a range of a predetermined distance from the own vehicle M based on the peripheral environment information acquired by the peripheral monitoring unit 22. When the own vehicle M has not reached the lane change timing, or even if the own vehicle M has reached the lane change timing, when a parallel traveling vehicle is recognized on the passing lane or a following vehicle is recognized in the predetermined distance range on the passing lane, a determination is made that passing is impossible, and the process returns to the step S4.

When the own vehicle has reached the lane change timing and neither an immediately preceding vehicle nor a parallel traveling vehicle is recognized on the passing lane and no following vehicle is recognized in the predetermined distance range on the passing lane, a determination is made that lane change is possible, and the process proceeds to step S17. In the step S17, the ALC control is executed. Since description on the ACL control has already been made in the step S14, description thereof will be omitted here. After the lane change to the passing lane is completed, the process proceeds to step S18.

In the step S18, a presence of an approaching following vehicle F on the passing lane is checked based on the peripheral environment information acquired by the peripheral environment recognition sensor 22a and recognized by the peripheral environment recognizer 22b of the peripheral monitoring unit 22. Whether the following vehicle is approaching is determined based on the temporal change of the inter-vehicle distance. Although approaching of the following vehicle can be determined based on the relative vehicle speed between the own vehicle M and the following vehicle F, when the own vehicle is followed at the relative vehicle speed of 0 km/h, whether the following vehicle is approaching cannot be accurately determined.

If it is determined that an approaching following vehicle is present, the process proceeds to step S19. When no approaching following vehicle is detected, the process returns to the step S4, and recognition of a preceding vehicle during the traveling on the passing lane is performed.

When the process proceeds to step S19, the inter-vehicle distance Ls between the following vehicle F and the own vehicle M is compared with an approaching determination threshold distance Lso. The approaching determination threshold distance Lso is a distance at which the following vehicle F is expected to perform lane change when the following vehicle F approaches the own vehicle M, and is set in advance based on an experiment or the like. The approaching determination threshold distance Lso may be a fixed value, or may be a variable value set to be longer distance as the vehicle speed is higher, based on the vehicle speed of the own vehicle M or the vehicle speed of the following vehicle F.

In the case of $Ls \geq Lso$, it is determined that the following vehicle F is still far away, and the process returns to the step S15, to continue the traveling on the target travel path set on the passing lane. Then, the process exits from the routine.

On the other hand, in the case of $Ls<Lso$, it is determined that the following vehicle F approaches the own vehicle M. An approaching time period Tim is incremented (Tim←Tim+1) in step S20, and the approaching time period Tim is compared with a set time period Timo in step S21. The set time period Timo is a time period during which a determination is made on whether the following vehicle F itself performs lane change when the following F approaches the own vehicle M. The set time period Timo may be a fixed value obtained in advance based on an experiment, or may be a variable value set based on the relative vehicle speed between the following vehicle F and the own vehicle M.

In the case of $Tim<Timo$, the process returns to the step S19. In the case of $Tim \geq Timo$, since the following vehicle F does not perform lane change even after the lapse of the set time period Timo, the process proceeds to step S22 in which a determination is made on whether the own vehicle M changes lane to the traveling lane, in other words, whether the own vehicle M yields the travel path to the following vehicle F.

In the step S22, first, it is checked whether the target travel path of the own vehicle M is set in the direction of the branch path. If the target travel path is set in the straight forward direction, the process jumps to step S24. If the target travel path is set in the direction of the branch path, the process proceeds to step S23.

In the step S23, the distance (branch point reaching distance) Lm (see FIG. 6) from the own vehicle M to the branch point L0 of the branch path is found out based on the own vehicle position and the additional map information in the dynamic map, and the branch point reaching distance Lm is compared with a lane change start distance Lmo2. The lane change start distance Lmo2 is a distance required for starting the lane change in order to cause the own vehicle M to travel from the passing lane in the direction of the branch path. The lane change start distance Lmo2 is set in advance based on an experiment or the like.

Figure 6:
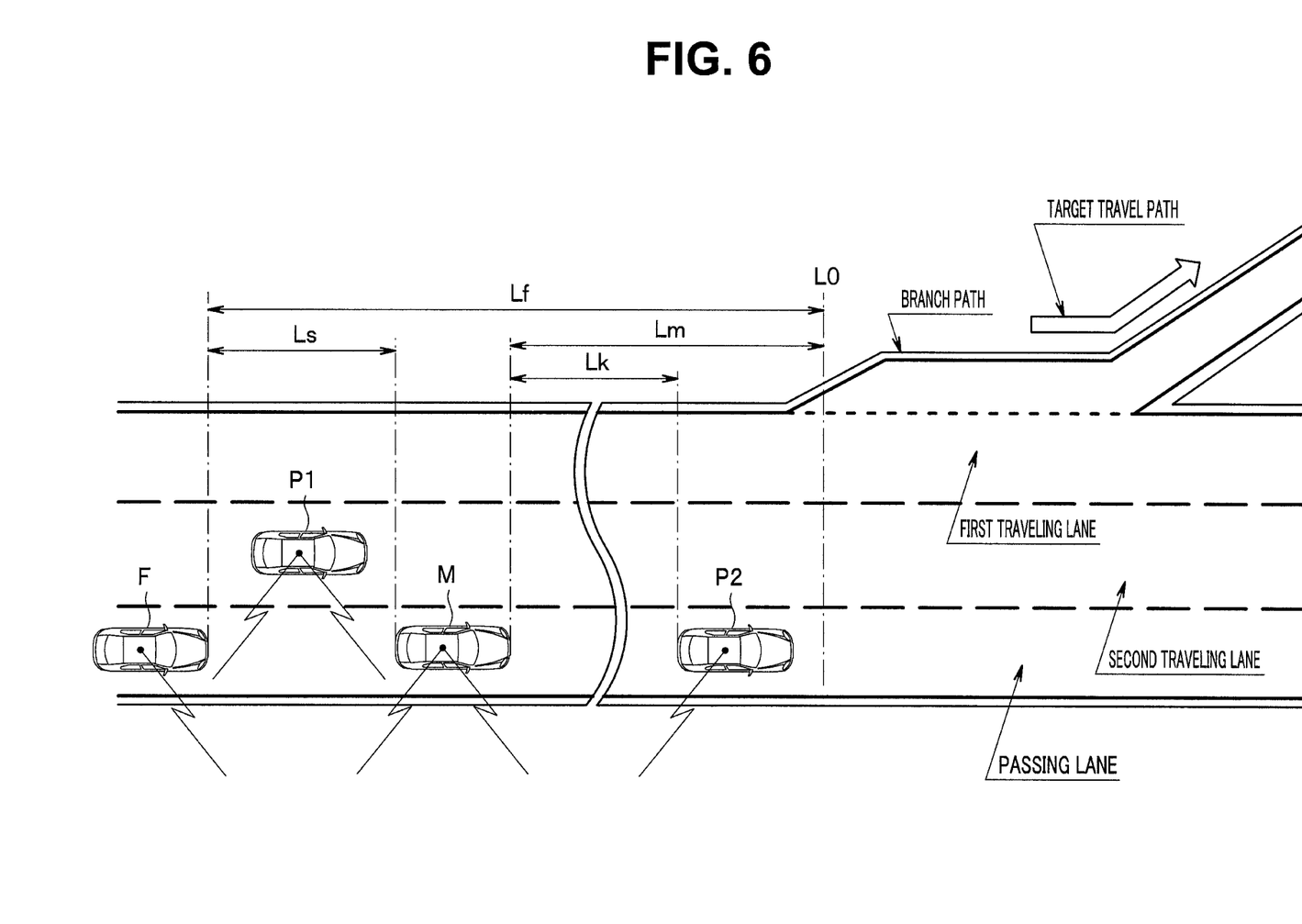
FIG. 6 is an explanatory view illustrating a state where a determination is made on whether the own vehicle yields a lane to a following vehicle based on a relation between the own vehicle and the following vehicle that are traveling on a passing lane.

As illustrated in FIG. 6, for example, when the road has three lanes and the own vehicle M traveling on the passing lane attempts to perform lane change in the direction of the branch path, the own vehicle M is required to first perform lane change from the passing lane to the second traveling lane and then change from the second traveling lane to the first traveling lane. When performing lane change to each of the traveling lanes, the own vehicle performs the lane change after flashing the blinker for a predetermined time period. The above-described lane change start distance Lmo2 is set to the value obtained by adding an allowance distance on each of the traveling paths to the distance required for the lane change. Therefore, the lane change start distance Lmo2 varies depending on the number of lanes of the road.

In the case of $Lm>Lmo2$, since the lane change timing has not been reached, the process proceeds to step S24. In the case of $Lm \leq Lmo2$, the lane change timing has been reached, and the process jumps to the step S15, to cause the own vehicle to travel along the target travel path set in advance.

When the process proceeds to the step S24 from the step S22 or the step S23, the traveling route (the following vehicle traveling route) set in the navigation system of the following vehicle F is acquired through the vehicle-to-vehicle communication. Next, the process proceeds to the step S25, and it is checked whether the following vehicle traveling route is set in the direction of the branch path. If the following vehicle traveling route is set in the direction of the branch path, the process branches to step S26. If the following vehicle traveling route is set in the straight forward direction, the process proceeds to step S27.

When the process proceeds to the step S26, the distance (branch point reaching distance) Lf from the following vehicle F to the branch point L0 is calculated based on the following vehicle traveling route, and the branch point reaching distance Lf is compared with a lane change start distance Lfo. The lane change start distance Lfo is a distance estimated to be required for starting the lane change in order to cause the following vehicle F to travel in the direction of the branch path. The lane change start distance Lfo is set in advance based on an experiment or the like.

In the case of Lf>Lfo, it is estimated that the following vehicle F travels straight forward on the passing lane, and the process proceeds to step S27. In the case of Lf≤Lfo, it is estimated that the following vehicle F starts lane change, and the process returns to the step S15, to cause the own vehicle M to travel along the target travel path. Then, the process exits from the routine.

When the process proceeds to step S27 from the step S25 or the step S26, it is checked whether the lane change to the adjacent lane is possible so as to cause the own vehicle M to perform lane change to the adjacent lane (the second traveling lane in FIG. 6), to clear the passing lane, that is, yield the passing lane for the following vehicle F. In order to check whether the lane change to the adjacent lane is possible, whether at least one of an immediately preceding vehicle or a parallel traveling vehicle is recognized on the adjacent lane and whether a following vehicle is recognized on the adjacent lane within the preset distance are checked based on the forward traveling environment of the adjacent lane, which is recognized by the forward traveling environment recognizer 21d of the camera unit 21, and the moving body information recognized by the peripheral environment recognizer 22b of the peripheral monitoring unit 22. The preset distance is a sufficient distance not to interfere with the traveling of the following vehicle when the own vehicle M performs lane change. The preset distance is set in advance based on an experiment or the like.

When at least one of an immediately preceding vehicle or a parallel traveling vehicle is recognized on the lane to which the own vehicle attempts to perform lane change or a following vehicle is recognized on the lane within the preset distance, a determination is made that the lane change to the adjacent lane is difficult, and the process returns to the step S15, to cause the own vehicle M to travel along the target travel path set on the passing lane. On the other hand, when none of the above-described vehicles is recognized on the lane to which the own vehicle attempts to perform lane change, a determination is made that the lane change to the adjacent lane is possible, and the process proceeds to step S28.

In the step S28, the ALC control is executed, and the process proceeds to the step S15. Since description has already been made on the ALC control in the step S14, description thereof will be omitted here. When the own vehicle changes lane to the adjacent lane, the target travel path is temporarily set on the traveling lane, and in the next execution of the routine, the target travel path is newly constructed in the step S2.

If no following vehicle F approaching the own vehicle M is detected while the own vehicle M is traveling on the passing lane, the program returns from the step S18 to the step S4, to detect the preceding vehicle P traveling ahead of the own vehicle M.

Therefore, as illustrated in FIG. 6, for example, when the own vehicle M performs lane change to the passing lane during the traveling on the second traveling lane in order to pass the preceding vehicle P1 traveling ahead of the own vehicle, if another preceding vehicle P2 is detected on the passing lane, the processes in the steps S5 to S14 are performed, with the preceding vehicle P2 being a target. In the step S14, the ALC control for the lane change to the traveling lane (the second traveling lane in FIG. 6) adjacent to the passing lane is executed.

Thus, in the present embodiment, when the following vehicle F approaching the own vehicle M is detected while the own vehicle M is traveling on the passing lane, the following vehicle traveling route of the following vehicle F is read, and if the following vehicle traveling route is set in the direction of the branch path, it is estimated that the following vehicle F performs lane change before approaching the own vehicle M, to cause the own vehicle M to travel continuously on the passing lane without yielding the lane, thereby be capable of not only ensuring the traveling stability but also reducing the feeling of incompatibility to be given to the driver by preventing the unnecessary ALC control.

Note that the technology is not limited to the above-described embodiment, and it is needless to say that the present embodiment can be applied to the case where the traveling road has two lanes or four or more lanes, for example.

In addition, each of the branch point reaching distances Lm, Lp, and Lf may be branch point reaching time periods. In such a case, the branch point reaching determination threshold distances Lmo1, Lpo, and the lane change start distances Lmo2, Lfo may be branch point reaching determination threshold time periods Lmo1, Lpo and lane change start time periods Lmo2, Lfo, respectively.

Each of the locator unit 11, the forward traveling environment recognizer 21d, and the automatic driving control unit 26 illustrated in FIG. 1 can be implemented by the aforementioned microcomputer, and also by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator calculator 12 including the own vehicle position estimation calculator 12a, the road map information acquirer 12b, and the traveling route setting calculator 12c, and the automatic driving control unit 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

As described above, according to the embodiment of the technology, a target travel path along which the own vehicle is caused to travel by automatic driving is generated on a traveling route from the current position to a destination, a determination is made on whether another vehicle is detected on the traveling lane on which the own vehicle is traveling, based on the traveling environment information acquired by the traveling environment information acquirer, and in the case where the other vehicle is detected, if the relative vehicle speed between the set vehicle speed of the own vehicle and the vehicle speed of the other vehicle exceeds a predetermined threshold speed, a determination is made on whether the traveling route of the other vehicle is set in the direction of the branch path based on the traveling route of the other vehicle acquired by the other-vehicle traveling route acquirer, and when the traveling route of the other vehicle is set in the direction of the branch path, the own vehicle is caused to follow the other vehicle along the target travel path without passing the other vehicle, to thereby be capable of preventing the unnecessary lane change control, ensuring the traveling stability of the own vehicle, and reducing the feeling of incompatibility to be given to the driver.

The invention claimed is:

1. An automatic driving assist apparatus comprising:
a route information input unit configured to receive an input of information of a destination by an operation from outside the automatic driving assist apparatus;
at least one processor configured to function as:
   a map information acquirer configured to acquire road map information;
   an own vehicle position estimator configured to estimate an own vehicle position that is a current position of an own vehicle; and
   a traveling route setting unit configured to set a traveling route connecting the own vehicle position estimated by the own vehicle position estimator and the destination input through the route information input unit, on a basis of the road map information acquired by the map information acquirer;
sensors configured to acquire traveling environment information around the own vehicle;
an automatic driving controller,
the automatic driving controller comprising:
   a target travel path generator configured to generate, on the traveling route set by the traveling route setting unit, a target travel path along which the own vehicle is caused to travel by automatic driving;
   an other-vehicle detection determiner configured to determine whether another vehicle is detected on a traveling lane on which the own vehicle is traveling, on a basis of the traveling environment information acquired by the traveling environment information acquirer;
   a relative vehicle speed determiner configured to determine whether a relative vehicle speed between a set vehicle speed of the own vehicle and a vehicle speed of the another vehicle exceeds a predetermined threshold speed, in a case where the other-vehicle detection determiner detects the another vehicle traveling ahead of the own vehicle;
   an other-vehicle traveling route determiner configured to determine whether the traveling route of the another vehicle is set in a direction of a branch path, on a basis of a traveling route of the another vehicle received from the another vehicle in a case where the relative vehicle speed determiner determines that the relative vehicle speed exceeds the predetermined threshold speed; and
   an automatic traveling controller configured to cause the own vehicle to travel following the another vehicle along the target travel path generated by the target travel path generator without passing the another vehicle in a case where the other-vehicle traveling route determiner determines that the traveling route of the another vehicle is set in the direction of the branch path.

2. The automatic driving assist apparatus according to claim 1, wherein the automatic driving controller causes the own vehicle to travel following the another vehicle along the target travel path generated by the target travel path generator, when the other-vehicle traveling route determiner determines that the traveling route of the another vehicle is set in the direction of the branch path and a reaching distance or a reaching time period for the another vehicle to reach the branch path is within a threshold value set in advance.

3. The automatic driving assist apparatus according to claim 2,
   wherein the automatic traveling controller comprises a lane change controller that controls the own vehicle to steer in a direction of an adjacent lane, and
   the lane change controller performs steering control for causing the own vehicle to pass the another vehicle when estimating that the another vehicle starts steering in the direction of the branch path.

4. The automatic driving assist apparatus according to claim 3, wherein the lane change controller estimates that the another vehicle starts steering in the direction of the branch path when the another vehicle reaches an entrance of the branch path.

5. The automatic driving assist apparatus according to claim 2,
   wherein the automatic traveling controller comprises a lane change controller that controls the own vehicle to steer in a direction of an adjacent lane, and
   wherein the lane change controller controls the own vehicle to steer in the direction of the adjacent lane, when the other-vehicle traveling route determiner determines that the relative vehicle speed between the set vehicle speed of the own vehicle and the vehicle speed of the another vehicle exceeds the predetermined threshold speed, the traveling route of the another vehicle is set in the direction of the branch path, and a reaching distance or a reaching time period, of the another vehicle, to reach the branch path exceeds a threshold value set in advance.

6. The automatic driving assist apparatus according to claim 5,
   wherein the adjacent lane is a passing lane, and after the lane change controller causes the own vehicle to perform lane change to the passing lane, when the other-vehicle detection determiner detects the another vehicle approaching the own vehicle from a back side of the own vehicle, and
   wherein the another vehicle approaches from the back side,
   the other-vehicle traveling route determiner determines whether the traveling route of the another vehicle is set in the direction of the branch path, on the basis of the traveling route of the another vehicle approaching from the back side, and
   the automatic traveling controller causes the own vehicle to travel along the target travel path set to the passing lane, the target travel path being generated by the target travel path generator, without yielding the passing lane to the another vehicle, when the other-vehicle traveling route determiner determines that the traveling route of the another vehicle approaching from the back side is set in the direction of the branch path.

7. The automatic driving assist apparatus according to claim 1,
   wherein the automatic traveling controller comprises a lane change controller that controls the own vehicle to steer in a direction of an adjacent lane, and the lane change controller performs steering control for causing the own vehicle to pass the another vehicle when estimating that the another vehicle starts steering in the direction of the branch path.

8. The automatic driving assist apparatus according to claim 7, wherein the lane change controller estimates that the another vehicle starts steering in the direction of the branch path when the another vehicle reaches an entrance of the branch path.

9. The automatic driving assist apparatus according to claim 1,
wherein the automatic traveling controller comprises a lane change controller that controls the own vehicle to steer in a direction of an adjacent lane, and
wherein the lane change controller controls the own vehicle to steer in the direction of the adjacent lane, when the other-vehicle traveling route determiner determines that the relative vehicle speed between the set vehicle speed of the own vehicle and the vehicle speed of the another vehicle exceeds the predetermined threshold speed, the traveling route of the another vehicle is set in the direction of the branch path, and a reaching distance or a reaching time period, of the another vehicle, to reach the branch path exceeds a threshold value set in advance.

10. The automatic driving assist apparatus according to claim 9,
wherein the adjacent lane is a passing lane, and after the lane change controller causes the own vehicle to perform lane change to the passing lane, when the other-vehicle detection determiner detects the another vehicle approaching the own vehicle from a back side of the own vehicle, and
wherein the another vehicle approaches from the back side,
the other-vehicle traveling route determiner determines whether the traveling route of the another vehicle is set in the direction of the branch path, on the basis of the traveling route of the another vehicle approaching from the back side, and
the automatic traveling controller causes the own vehicle to travel along the target travel path set to the passing lane, the target travel path being generated by the target travel path generator, without yielding the passing lane to the another vehicle, when the other-vehicle traveling route determiner determines that the traveling route of the another vehicle approaching from the back side is set in the direction of the branch path.

11. An automatic driving assist apparatus comprising circuitry, the circuitry being configured to:
acquire road map information;
estimate an own vehicle position that is a current position of an own vehicle;
receive an input of information of a destination by an operation from outside the automatic driving assist apparatus;
acquire traveling environment information around the own vehicle;
set a traveling route connecting the estimated own vehicle position and the input destination, on a basis of the road map information;
acquire a traveling route of another vehicle through a communication from outside the automatic driving assist apparatus;
generate, on the set traveling route, a target travel path along which the own vehicle is caused to travel by automatic driving;
determine whether the another vehicle is detected on a traveling lane on which the own vehicle is traveling, on a basis of the acquired traveling environment information;
determine whether a relative vehicle speed between a set vehicle speed of the own vehicle and a vehicle speed of the another vehicle exceeds a predetermined threshold speed, in a case where the another vehicle traveling ahead of the own vehicle is detected;
determine whether the traveling route of the another vehicle is set in a direction of a branch path, on a basis of the acquired traveling route of the another vehicle, in a case where a determination is made that the relative vehicle speed exceeds the predetermined threshold speed; and
cause the own vehicle to travel following the another vehicle along the generated target travel path without passing the another vehicle in a case where a determination is made that the traveling route of the another vehicle is set in the direction of the branch path.

* * * * *